United States Patent Office 3,266,725
Patented August 16, 1966

3,266,725
SYSTEMS FOR CONTROLLING FURNACE
TEMPERATURES WITHOUT OVERSHOOT
James L. Garrison, Hatboro, and William R. Haden, Jr.,
Roslyn, Pa., assignors to Leeds and Northrup Company, Philadelphia, Pa., a corporation of Pennsylvania
Filed Mar. 25, 1963, Ser. No. 267,442
12 Claims. (Cl. 236—15)

This invention relates to control systems for furnaces and has for an object the provision of means for computing the heat-head of a furnace which for a given load of work will bring the work temperature to its set point without overshoot.

It has long been recognized that the time required to bring work within a furnace to a predetermined set-point temperature varies with the mass and initial temperature of such work. Accordingly it has been proposed to measure the temperature of the furnace and the temperature of the work and to control the heating of the furnace in response to such temperatures. Such systems leave much to be desired in that they lack any means of correlating the heat-head of the furnace, the magnitude of the load, and the set-point temperature to be attained by the load without overshoot.

In the heat treatment of work of various kinds it is frequently of greatest importance that the set-point temperature of the work shall not be exceeded to any consequential degree. For example, in the annealing of copper and brass and other metals, grain structure changes quite rapidly with temperature. Accordingly, if a particular grain structure be desired in the annealed work, it is important that the set-point temperature of the work be set to correspond with the desired grain structure and that the furnace temperature then be controlled in a manner to prevent rise of the temperature of the work above the aforesaid set-point.

In carrying out the invention in one form thereof, there are provided means for measuring the temperature of the work and for developing a signal representative of that temperature. This temperature signal is utilized for the computation of that desired temperature of the furnace which will establish a heat-head necessary to bring the work to a predetermined set-point temperature without undesired overshoot. This computation of course takes into account the mass of the furnace, the mass of work, and of course their respective temperatures. By then utilizing means responsive to the difference between the actual temperature of the furnace and the computed desired temperature for the control of the heat input, the furnace can be brought to the computed desired temperature with assurance that the temperautre of the work will rise to the set-point without undesired overshooting of that point. It is in this manner that grain structure in the heat treated work can be predetermined and made to conform with that which is desired for the end product.

For further objects and advantages of the invention, including additional refinements introduced into the control and computing networks, reference is to be had to the following detailed description taken in conjunction with the accompanying drawings in which.

Figure 1:
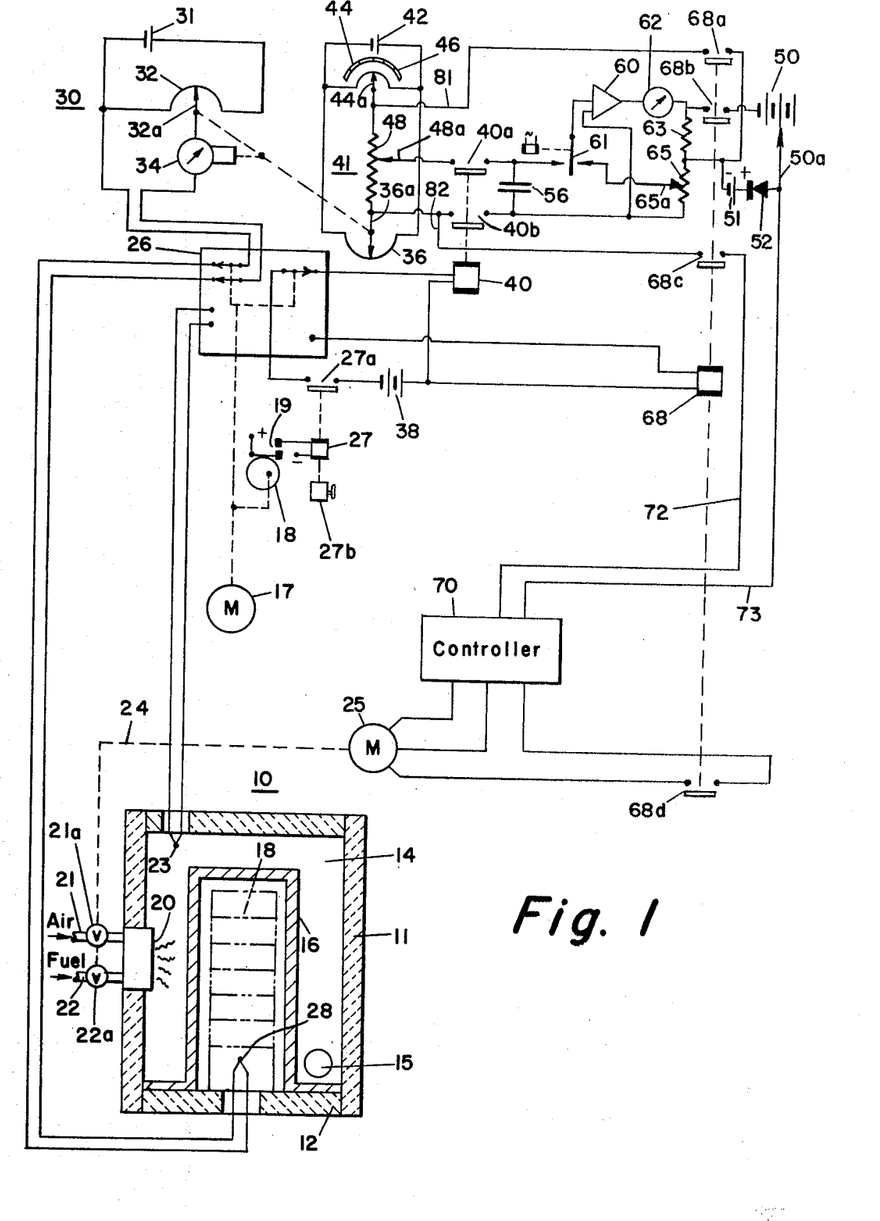
FIG. 1 diagrammatically illustrates one embodiment of the invention applied to a heat treating furnace.

Referring now to FIG. 1, the invention in one form thereof has been disclosed as applied to a heat treating furnace 10 having an insulated shell 11 and a base 12 enclosing the firing chamber 14 within which there is disposed a retort 16 of a material such as a nickel steel alloy for the transfer of heat to the work 18 shown as a stack of rolls of strip metal. It will be assumed that the rolls of strip metal comprising the work 18 are to be annealed and also to be isolated from the products of combustion during the annealing operation. Though the furnace 10 may be elevated in temperaure by any suitable heating means, in FIG. 1 there is illustrated a fuel burner 20 which produces within the firing chamber 14 hot products of combustion which after transfer of heat to the retort 16 are withdrawn as by a flue 15 to a stack (not shown). The burner 20 has air and fuel supplied thereto under the control of regulating valves 21a and 22a jointly operable by a mechanical connection 24 illustrated by the broken line extending to suitable operating means shown as a motor 25.

If it be assumed that the work 18 has just been placed within the furnace 10 through conventional access means (not shown) and that the retort 16 is in place, it will be understood that the furnace as a whole and the work may be at room temperature. The actual temperature of the furnace will be measured by means of a thermocouple 23. A second thermocouple 28 is disposed within the retort 16 at a position indicative of the average temperature for the load 18. Preferably the thermocouple 23 will be located in a region in which the highest temperature of the furnace is developed though not necessarily in the flame from the burner. It will be seen at once that the temperature of the furnace will rise much more rapidly than will that of the work 18. By reason of the mass of retort 16 and insulating material 11 forming the furnace there will be stored therein a considerable amount of heat which even after the burner 20 be extinguished will continue to cause a rise in temperature of the work 18 until equilibrium conditions have been attained. It is this storage of heat, hereafter referred to as the heat-head, which has in the past caused the temperature of the work to rise above the set-point and thus to exceed the desired annealing temperature which achieves in the work the desired grain structure for its final use.

In accordance with the present invention there is utilized not only the thermocouple 28 and an associated network to produce a work temperature signal corresponding to the temperature of the work, but also a computing network which provides a measurement of the heat-head of the furnace 10 which will, after extinguishment of burner 20, bring the work to its desired set-point temperature without undesired overshoot. In some instances the burner 20 need not be extinguished, but its heat output will be reduced to a point where it will be playing a minor part in the transfer of heat to the work as compared with the heat-head. The manner in which these comparisons and computations are made will now be explained.

It will be assumed that a motor 17 has through a cam 18 closed the contacts 19 and concurrently has operated the movable contacts of a selector switch 26 to their illustrated positions. The motor 17 drives stepping switch 26 and cam 18 intermittently to close the associated circuits. An energizing circuit is completed by contacts 19 for the operating coil of a relay 27. Its contacts 27a are not immediately closed by reason of a delay interposed by a dashpot 27b comprising time delay means.

The upper left-hand contacts of selector switch 26 complete a circuit from the thermocouple 28 to a temperature measuring circuit 30 comprising a potentiometer including a battery 31, a slidewire 32 and a contact 32a adjustable by a detector 34 to produce in the measuring circuit a voltage equal and opposite to that developed therein by thermocouple 28. The detector 34 may be any of several types well known to those skilled in the art such for example as shown in Williams' Patent 2,113,164.

As a detector 34 moves contact 32a to its balancing position it concurrently moves a contact 36a associated with a slidewire 36 to a new position. After the detector 34 drives contact 32a to its balancing position, normally in a short period of time of the order of a few seconds or less, the time delay device 27b permits the closing of contacts 27a to complete an energizing circuit from a suitable source of supply such as a battery 38 by way of the upper right-hand contact of selector switch 26 to the energizing coil of a relay 40. This relay 40 is thereupon energized to close its contacts 40a and 40b.

The slidewire 36 is a re-transmitter in that the position of its contact 36a follows the position of the contact 32a of the measuring slidewire 32. The re-transmitting slidewire 36 is included in a bridge network 41 supplied from a suitable source of supply such as battery 42. The remaining arms of the bridge are formed by a slidewire 44 having a manually adjustable contact 44a to predetermine the set-point temperature of the work 18. If desired, a scale 46 may be associated with contact 44a for ease in setting it to the desired and predetermined set-point temperature.

By reason of the foregoing connections the current through and the voltage across a resistor 48 will be proportional to the difference between the actual temperature of the work 18 and the set-point temperature as established by the position of contact 44a relative to slidewire 44. The aforesaid difference in temperature, for convenience, may be referred to as $\Delta T_2$. It provides a quantity representing a comparison between the existing work temperature and what it should be at set-point temperature. This temperature difference $\Delta T_2$ is to be weighted by reason of the mass or weight of the load 18 as, for example, by a factor $K_1$ proportional to the heat requirements of the load 18 to attain its set-point temperature. Accordingly, this factor $K_1$ is introduced by adjustment of a contact 48a associated with resistor 48, which also may be in the form of a slidewire, to predetermine the fraction of the voltage across slidewire 48 applied by way of the contact 48a and contacts 40a and 40b to a storage capacitor 56. This capacitor is thus charged to a value equal to that across the selected fraction of resistor 48. Since the factor $K_1$, a proportionality constant, will frequently be larger than unity, the manner in which this fact is provided for will be explained in connection with the operation of an amplifier 60. The quantity $K_1\Delta T_2$ represents the major proportion of the heat-head, that is, the heat which must be made available to bring the temperature of the work to its set-point. It includes not only the temperature difference already described but also the factor $K_1$ which is related to the weight or mass of the load 18 and the heat storage capacity of the furnace.

By reason of the fact that the furnace 10 radiates heat therefrom and may lose heat in other ways, compensation must be made for losses from the furnace 10 at the time the work 18 has been brought to its set-point temperature. This loss factor, $K_2$, is taken into account by adjusting the magnitude of the voltage from a suitable source of supply 50 shown as a battery with an adjustable contact 50a. The manner in which this voltage, proportional to $K_2$, is taken into account in the computations will be later explained. It should, however, be remembered that with furnace work loads which are to be allowed to cool immediately after the work temperature $T_2$ has reached its set point the factor $K_2$ need not be introduced as is sometimes necessary when a long soak period is involved. Well-insulated furnaces will not require the factor $K_2$ even with long soak periods.

Remembering that the charge on the capacitor 56 is proportional to the temperature difference or $\Delta T_2$ modified by a factor $K_1$, it will be seen at once that as the movable contact 61 of a vibrator moves between its left-hand and right-hand positions it will produce in its output current path including resistors 63 and 65 a current sufficient to maintain a potential at the right-hand contact equal to that established by capacitor 56 at its left-hand contact. Such an amplifier is disclosed in Cranch et al. application Serial No. 839,788, now Patent No 3,092,321, filed September 14, 1959 for "Automatic Control System" and assigned to the same assignee as the present invention.

To provide a convenient indication of the current output of amplifier 60, a current responsive meter 62 has been illustrated in its output connections. The current output from the amplifier flows through resistors 63 and 65, the latter resistor having associated with its a contact 65a which may be adjusted in order to predetermine the magnitude of the current output for a given input. In effect the amplifier 60, through the operation of the vibrator contact 61 driven between its two positions by means of a coil 61a energized from an alternating current source of supply, varies the current output of the amplifier 60 to maintain equal and opposite the potential drop across the lower part of the resistor 65 and the voltage across the capacitor 56. Thus the current output of the amplifier 60 will be decreased as the value of this resistance is increased and conversely. In this way there may be developed across resistor 63 a voltage output proportional to the factor $K_1\Delta T_2$. This voltage, proportional to the aforesaid factor, is maintained without loss of charge on the capacitor 56, a matter of importance since the voltage across resistor 63 is to be utilized as a part of the remainder of the computing system now to be described. The voltage across resistor 63 will be larger than that across capacitor 56 and will increase as contact 65a is moved to decrease the fraction of resistance included in the feed-back or balancing circuit of amplifier 60.

Having now achieved a measurement of the deviation of the temperature of the work 18 from the set-point as well as the computations based thereon, the motor 17 operates the stepping switch 26 and through cam 18 opens and then closes contact 19. The upper left-hand contacts of selector switch 26 are moved to their lower positions to connect furnace thermocouple 23 to the measuring circuit 30. At the same time the upper right-hand contact transfers the connection from relay 40 to relay 68. The relay 40, already deenergized, has opened its contacts 40a and 40b thus leaving the capacitor 56 isolated from the bridge network 41. The detector 34 now detects any unbalance and adjusts slidewire contact 36a to a new position to again balance the measuring circuit 30. After the expiration of a time interval slightly in excess of the interval required to balance the measuring circuit, contacts 27a are again closed. An energizing circuit is thereby completed from battery 38 and the selector switch 26 for the relay 68 which thereupon operates to close its contacts 68a, 68b, 68c and 68d.

Since the re-transmitting slidewire contact 36a now has a position proportional to the temperature of the furnace 10 as measured by the thermocouple 23, it will be seen at once that the voltage appearing across resistor 48 will be proportional to $\Delta T_1$, the difference between furnace temperature and the predetermined set-point temperature previously established for the work by the selected setting of contact 44a. This voltage by means of conductors 81 and 82 is included in series circuit relation with the voltage across resistor 63. Since these voltages are of opposite polarity there is developed a difference-voltage in the circuit including conductors 72 and 73, this circuit also including the adjustable source of voltage represented by the battery 50. The voltage of the battery 50 is added to the aforesaid voltage difference. The manner in which the resultant voltages across conductors 72 and 73 may be taken as representative of the difference between the actual and the desired heat-head of furnace 10 may be mathematically stated as follows:

$$\text{Control voltage} = \Delta T_1 - (K_1 \Delta T_2 + K_2)$$

where $\Delta T_1$ is equal to the difference between the furnace temperature as measured by the thermocouple 23 and the set-point temperature of the work. The control voltage as applied to a controller 70 energizes the motor 25 in a direction to change the fuel and air supply to the burner 20 in directions to reduce to zero the control voltage. In this connection it is to be noted that the controller 70 is through contacts 68d effectively disconnected from motor 25 during the interval required for completion of the foregoing computations, i.e., until after the closing of contacts 27a indicative of the completion of balance of the measuring circuit with thermocouple 23 connected thereto.

The manner in which the system of FIG. 1 achieves the objects of the present invention may also be explained by reference to FIG. 2 wherein temperature has been plotted as abscissae and time is ordinates. The diagram of FIG. 2 has been drawn on the assumption that the burner 20 of FIG. 1 has been in operation for a period of time. Thus at the time $t_1$ the work as shown by curve 53 has attained a value of $T_m$ while the furnace 10 as shown by curve 54a has achieved a temperature $T_n$, the maximum permissible temperature for the furnace. In manner later to be explained, this maximum temperature $T_n$ is maintained through operation of controller 70 until the time $t_2$, the temperature of the work then having the value $T_r$. It will be further observed that the temperature $T_d$ is the desired temperature for the work. The system of FIG. 1 reduces to a minimum, as zero, the delivery of fuel to the burner 20 at the time $t_2$. Hence the furnace temperature begins to decrease as indicated by the curve 54b, the furnace at that time losing heat due to its losses but primarily due to the transfer of its heat to the work so that at the time $t_3$ the work temperature will have just arrived at the temperature of its set-point. At time $t_3$, the furnace temperature will be above the set-point by just that amount needed to compensate for furnace losses. Stated differently, the furnace heat-head which is to be maintained is equal to $(K_1 \Delta T_2 + K_2)$.

Graphically, it will be seen that the quantity $\Delta T_2$ is known since the measuring system through thermocouple 28 periodically monitors the temperature of the work and provides an output signal proportional to the difference between the desired setpoint temperature of the work and the actual temperature of the work. The system of FIG. 1 continuously provides an output equal to $K_1 \Delta T_2 + K_2$.

The equation does not apply during the times $t_1$ and $t_2$ for the reason there has been arbitrarily imposed a limitation on the maximum heat-head to be developed by the furnace. As the work temperature approaches its set-point between the times $t_2$ and $t_3$ the needed heat-head $K_1 \Delta T_2 + K_2$ decreases and the controller 70 continues to function to modify the output of burner 20 to take into account the required heat-head of the furnace which will produce the arrival of the temperature of the work at the set-point without overshoot.

The manner in which there is limited the maximum temperature and heat-head which may be developed by the furnace 10 will now be explained.

To place a limit on the temperature to which the furnace may be controlled by controller 70 a limit circuit is provided by a battery 51 and a diode 52. The battery 51 represents a voltage source of adjustable magnitude and one selected to be equal to the maximum permissible voltage which is to appear across the combination of resistor 63 and its source 50 thus establishing the maximum value for $\Delta T_1$. The battery 51 applies a back-bias to the diode 52. When the voltage across the combination of resistor 63 and source 50 rises above the back-bias value, the diode 52 conducts and thus serves to provide a limit on the maximum amplitude of the signal to be combined with $\Delta T_1$ with the difference being applied to the controller 70 to control the fuel and air supply to the burner 20.

Now that the principles of the invention have been explained in connection with the embodiment of FIG. 1, it will be understood that many variations may be made within the scope of the claims appended hereto and that certain features embodied in later embodiments to be described may be incorporated into the system of FIG. 1 and vice versa. It will be remembered that in FIG. 1 the thermocouple 28 was described as being located in a position to respond to the average temperature of the work 18. Such a location will be preferred for the system of FIG. 1 though not necessarily in a location at the bottom of the furnace 10 where the thermocouple 28 has been illustrated in FIG. 1. The position of average temperature may vary for different loads. Also, certain portions of the load may heat up at a more rapid rate than other portions and a modification of the control system to prevent that fast-heating portion from rising too far above the set-point temperature is desired. Such a modification has been illustrated in FIG. 3 where corresponding parts have been given corresponding reference characters.

Figure 3:
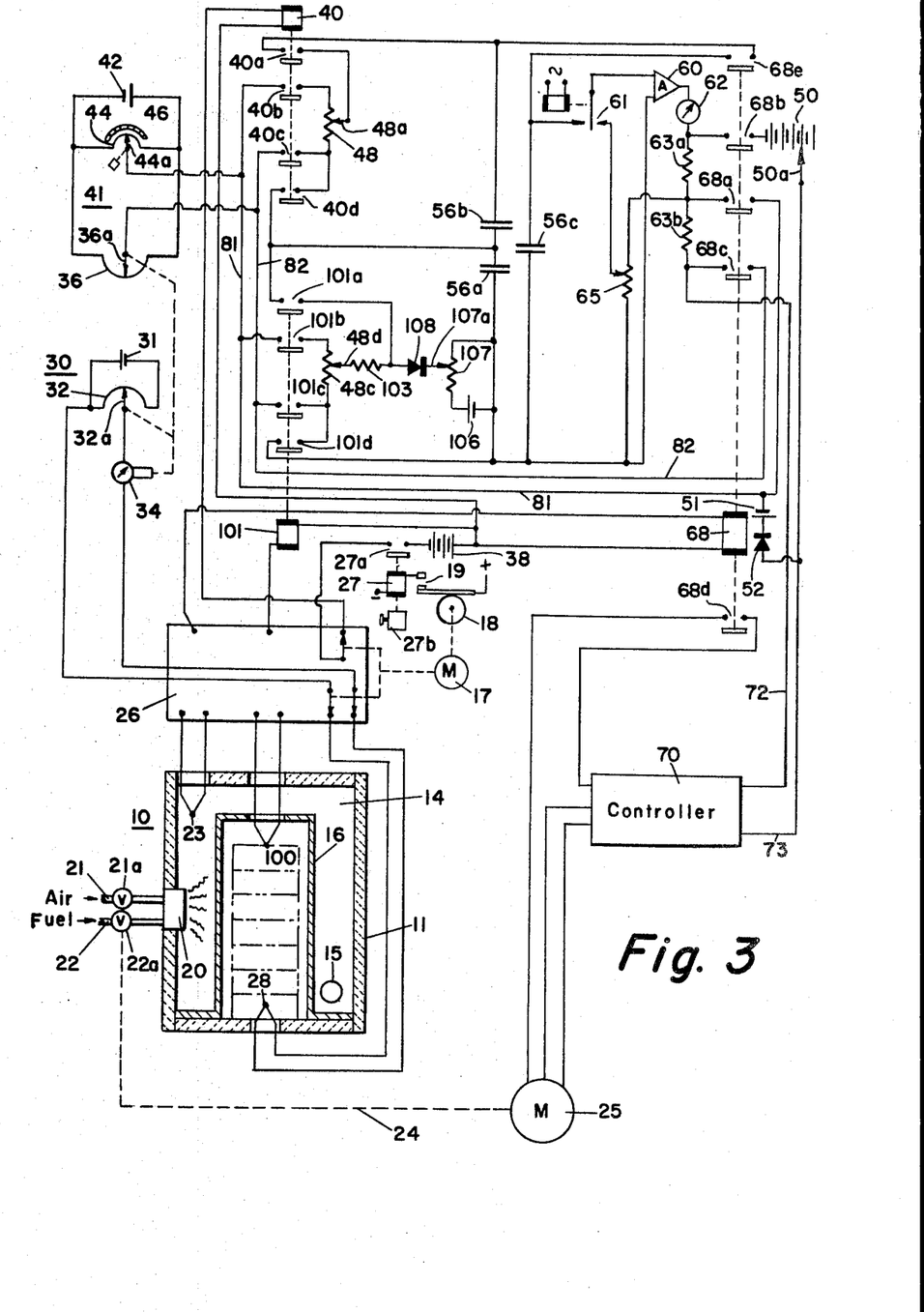
FIG. 3 diagrammatically illustrates a preferred form of the invention applied to a heat treating furnace.

Referring to FIG. 3, it will be observed that the position of thermocouple 28 at the lower part of the furnace has been retained and that there has been added a thermocouple 100 located at the top of the retort 16 though within the space which it encloses. In the embodiment of FIG. 3 the positions of thermocouples 28 and 100 are to be taken as representative of the slow-heating and fast-heating regions within the retort 16. The thermocouple 28 measures the temperature of the slow-heating region $T_2$ while the thermocouple 100 measures the temperature of the fast-heating region $T_3$. The difference between the actual temperature of the fast-heating region $T_3$ and the setpoint temperature will be referred to as $\Delta T_3$. Again it is noted that the thermocouple 23 in the fire box 14 has been located in the region of highest temperature.

By reason of the provision of the two thermocouples 28 and 100 within retort 16, it will be observed that the selector switch 26 is provided with additional contacts and that there has been added an additional relay 101. Instead of the single capacitor 56, as in FIG. 1, in FIG. 3, three capacitors 56a, 56b and 56c are utilized and in conjunction with the contacts 68e of relay 68.

In brief, there is supplied to capacitor 56b a charge proportional to $K_1 \Delta T_2$; and to the capacitor 56a a charge proportional to $K_3 \Delta T_3$. The charges or potential differences on these capacitors are added together in a circuit in series with the capacitor 56c to charge this capacitor to a potential equal to their sum. Thus the charge on capacitor 56c will be a function of temperatures $T_2$ and $T_3$.

The heat loss factor represented by the constant $K_2$ is included in the circuit by the battery 50. By reason of the foregoing computation, the output applied to the controller 70 is then effective to maintain the furnace temperature at a point above the set-point temperature of the work equal to the quantity $(K_1 \Delta T_2 + K_3 \Delta T_3 + K_2)$, this quantity being representative of the desired heat-head of the furnace to bring the temperature of the work 18 to its set-point without undesired overshoot of the fast-heating portion of the work. This heat-head is also limited by the circuit including diode 52 which is backed by battery 51 as previously described with regard to FIG. 1.

The manner in which the foregoing is accomplished will now be described in more detail.

With the parts in their illustrated positions it will be seen that the thermocouple 28 is connected through the pair of contacts in the selector switch 26 directly to the measuring circuit 30 including the detector 34 forming the measuring circuit. The temperature of thermocouple 28 is thereby measured and the re-transmitting contact 36a of slidewire 36 is accordingly adjusted. It will be understood that the set-point temperature for the work 18 has been established as described in FIG. 1 by adjustment of contact 44a. As the measuring system 30 is balanced, the timing means 27b permits the closure of relay contacts 27a to complete an energizing circuit from battery 38 by way of contacts 27a, the right-hand contact of selector switch 26 the operating coil of relay 40 and thence to the other side of the battery 38. The relay 40 thereupon closes to connect the resistor 48 by way of contacts 40d and 40c to the contacts 44a and 36a of the bridge network 41, as in FIG. 1, and pursuant to that embodiment also to connect through contacts 40a and 40b the potential across the lower section of resistor 48 to the capacitor 56b. Accordingly, this capacitor is charged to a potential proportional to the quantity $K_1 \Delta T_2$.

The motor 17 thereafter operates to open the contacts 19 to deenergize relays 27 and 40 and to operate the selector switch 26 to connect the thermocouple 100 to the measuring circuit 30 including detector 34. After the detector has positioned contact 36a to a position proportional to the temperature of thermocouple 100, the fast-heating portion of the work within retort 16, the contacts 19 are again closed to energize the relay 27 and to close the contacts 27a. There is then completed an energizing circuit from the battery 38 by way of the single contact of the selector switch 26, now in its second position. The relay 101 is energized to close its contacts 101a–101d inclusive. The contacts of relay 101 complete connections for applying the output from contacts 44a and 36a of the bridge network 41 to the resistor 48c having an adjustable contact 48d for introduction of the constant $K_3$. The potential across the lower fraction of resistor 48c is applied by way of a series resistor 103 and contacts 101a and 101d to the capacitor 56a which then acquires a charge proportional to the quantity $K_3 \Delta T_3$.

In order to limit the charge on capacitor 56a, there is provided a battery 106 supplying a potentiometer 107 the movable contact 107a of which is utilized to provide a back-bias on a diode 108 and thus to maintain it normally non-conductive. If, however, the potential on the anode of diode 108 exceeds that of the back-bias, the diode 108 will be rendered conductive thus limiting the charge on the capacitor 56a to the value set by contact 107a. With diode 108 conductive, flow of current by way of contact 48d is limited by the series resistor 103.

The motor 17 now initiates the third measuring operation by again opening contacts to deenergize relays 27 and 101. The motor 17 then closes the contacts 19 to energize relay 27 and the motor moves the pair of selector switches to their lowermost positions to connect the furnace thermocouple 23 to the measuring circuit 30 including detector 34. As soon as the re-transmitting slidewire contact 36a has been set to a position proportional to the temperature of furnace thermocouple 23 the relay 68 due to closure of contacts 27a is energized to close its contacts 68a–68e. The latter contacts 68e complete a series circuit including the capacitors 56a, 56b and 56c. Accordingly the capacitor 56c acquires a charge representing the sum of the potentials of capacitors 56a and 56b. Though capacitor 56c may be omitted, it will when utilized be of small size relative to the capacitors 56a and 56b.

The vibrator 61 in conjunction with the amplifier 60 thereupon compares the potential across capacitor 56c with that developed across the lower fraction of resistor 65. The amplifier 60 provides a current through resistor 65 to make the last-mentioned potential equal and opposite to that across capacitor 56c. The value of the current is indicated by the meter 62 and it will be noted that it also flows through the resistor 63a which is connected in a circuit identical with that of resistor 63 of FIG. 1.

Since there has now been derived from the contacts 36a and 44a a voltage or signal representative of the quantity $\Delta T_1$, it will be seen at once that the control voltage developed across conductors 72 and 73 will be proportional to the quantity $\Delta T_1 - (K_3 \Delta T_3 + K_1 \Delta T_2 + K_2)$.

The foregoing computation is completed by the connections which may be traced from contact 44a by way of conductor 81 contacts 68a the resistor 63b, contacts 68c and by way of conductor 82 to the contact 36a. Thus the current through resistor 63b will be proportional to the quantity $\Delta T_1$ and as derived from contacts 36a and 44a. Inasmuch as the conductors 72 and 73 are connected by way of the battery 50 and the contacts 68b across resistors 63a and 63b it will be seen that the described subtraction takes place and that the difference signal applied to the controller 70 will be proportional to the computed heat-head of the furnace 10 which at any given instant will provide an optimum heat-head providing the necessary heating rates which will not cause undesired overshoot by controlling burner 20 to bring the work temperature within the retort 16 to its set-point. It will then maintain the furnace temperature above that set-point temperature by an amount $K_2$ to provide the heat losses of the furnace.

From the foregoing it will be seen that in the embodiments of FIGS. 1 and 3 the control system in each case functions to measure a heat-head which is always proportional to the difference between the work load temperature and the desired set-point temperature.

Figure 2:
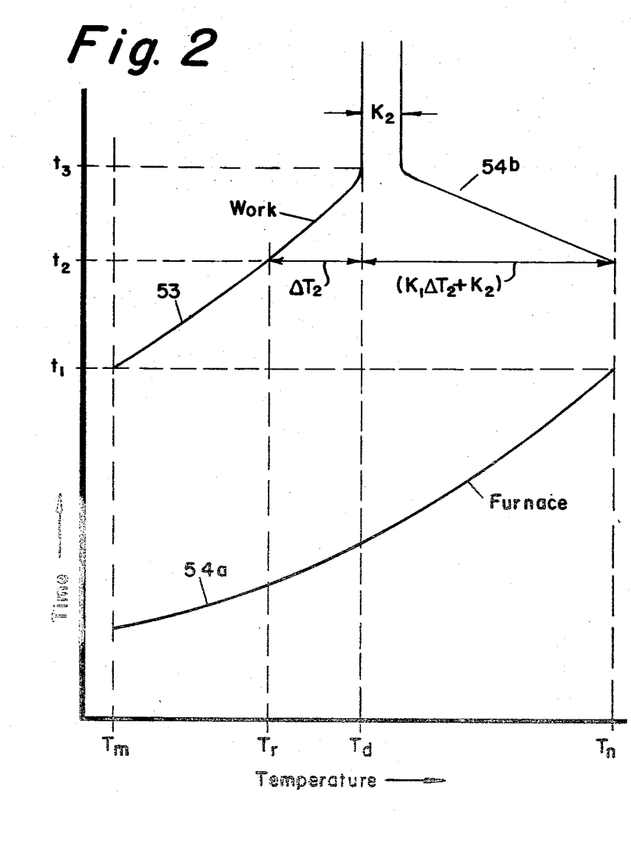
FIG. 2 is a diagram explanatory of the operation of FIG. 1.
Figure 4:
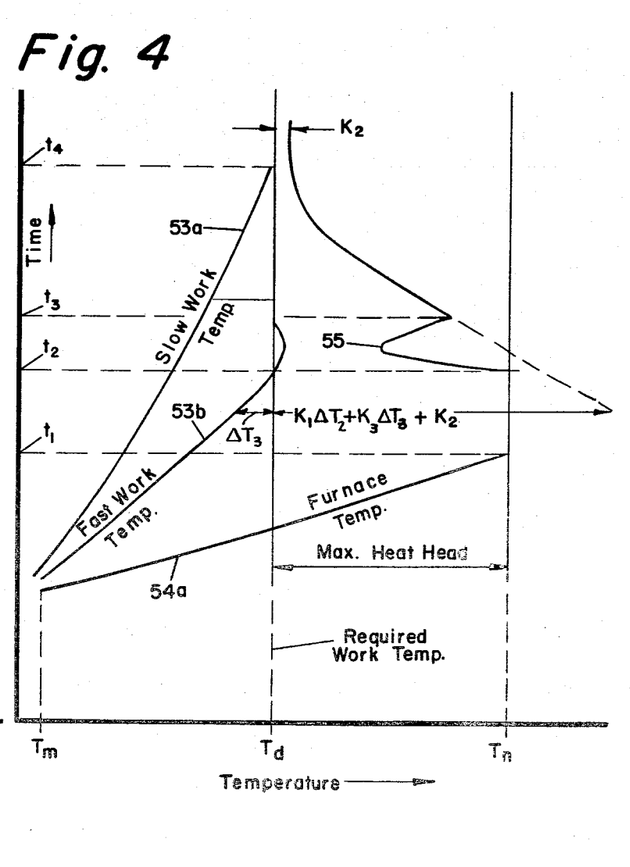
FIG. 4 is a diagram explanatory of the operation of FIG. 3.

As shown in FIG. 4 the operation is similar to the operation of the system of FIG. 1 as illustrated in FIG. 2. Referring to FIG. 4 as the furnace 10 reaches its selected maximum temperature $T_n$ at time $t_1$ the heat release from burner 20 is reduced. This is accomplished by making the factor $K_3$ larger than the factor $K_1$. Thus $K_3$ is a proportionality constant of magnitude determined by the degree of non-uniformity of work load and amount of permissible overshoot. The ratio $K_3/K_1$ increases with such non-uniformity and it is inversely proportional to the permissible amount of overshoot of temperature which may be tolerated. If that portion of the work which heats the fastest is to be brought to the set-point as fast as possible (minimum heating time) the quantity $K_3 \Delta T_3$ must have its maximum value limited. This is done by the action of diode 108 and back-bias potentiometer 107 as already described.

Graphically, when the quantities $\Delta T_2$ and $\Delta T_3$ reach their values at $t_1$, the burner is turned down. During the time from $t_1$ to $t_2$ the heat-head rapidly heats the fast-heating part of the load and continues to elevate the temperature of the slower-heating part of the load. As soon as the fast work temperature $T_3$ approaches the set-point temperature $T_d$ the value of $K_3 \Delta T_3$ becomes such that the quantity $K_1 \Delta T_2 + K_3 \Delta T_3 + K_2$ is less than the maximum tolerable heat-head $T_n - T_d$. The controller 70 begins to decrease the furnace temperature $T_1$ as shown along 55. There are then utilized actual values of $\Delta T_3$ unlimited by diode 108. As the temperature of the fast-heating part of the work returns to the set-point temperature $T_d$ at time $t_3$, the heat-head needed for the remainder of the work to be heated to the set-point will have been attained. The factor $K_2$ is again taken into account as shown in FIG. 4 and as earlier explained.

In the systems of FIGS. 1 and 3 the measuring and bridge networks perform dual functions by reason of the use of the storage capacitors and the switching relays. Though these represent preferred systems, the invention may be practiced by duplicating circuit components and instrumentalities in manner illustrated in the systems of FIGS. 5 and 6.

Figure 5:
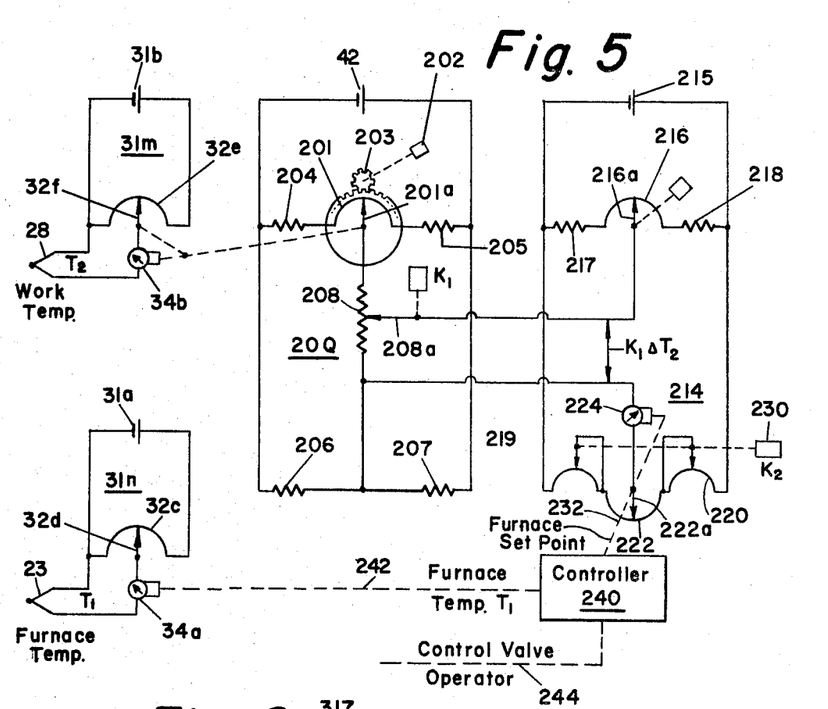
FIGS. 5 and 6 diagrammatically illustrate simplified forms of the invention.

In FIG. 5, two measuring systems 31m and 31n have been shown respectively associated with the thermocouples 23 and 28 located in the same positions in the furnace as illustrated in FIG. 1. The detector 34b positions a contact 201a of a bridge network 200 relative to its associated slidewire 201. To adjust the set-point any suitable means such as a knob 202 is arranged to drive through gearing 203 a rotatable carrier for the slidewire 201. Equal-valued resistors 204 and 205 are connected in series with slidewire 201 and on opposite sides thereof. Similar resistors 206 and 207 form the remaining arms of the bridge. Since the thermocouple 28 responds to the average measured temperature of the work, a voltage representative of the deviation of that temperature from the work temperature set-point will be developed across a resistor 208 connected from the junctions of resistors 206 and 207 and the contact 201a. By setting the contact 208a to a position proportional to the factor $K_1$ the voltage output from bridge 200 will be proportional to the factor $K_1 \Delta T_2$. In this embodiment of the invention a second bridge network 214 is provided supplied from a battery 215 and having a slidewire 216 the contact 216a of which may be manually adjusted to a point representative of the work-temperature set-point. Equal-valued resistors 217 and 218 are connected on opposite sides of the slidewire 216. Adjustable resistors 219 and 220 are connected on the opposite sides of a slidewire 222 having a movable contact 222a operable by a detector 224.

From the foregoing it will be seen that the detector 224 will respond to the difference between the potential at the contact 222a, the potential across the lower part of resistor 208 and the potential at contact 216a. The detector 224 operates contact 222a to a position of balance. There is established a desired value for $K_2$ by means of a knob 230. The resistors 219 and 220 are thereby simultaneously adjusted in corresponding directions to increase the resistance in one arm of bridge 214 while decreasing the resistance in the other arm. The resultant offset introduces into the circuit the constant $K_2$.

The detector 224 by way of the mechanical coupling 232 positions a control slidewire (not shown) in the controller 240. This slidewire may be of the type illustrated in the Davis et al. Patent No. 2,830,245. Such a slidewire is shown in that patent as slidewire 17 which may be bodily positioned as by coupling 232. Mechanical coupling 21 of the patent which adjusts the slidewire contact corresponds with the mechanical coupling 242 operable by the detector 34a of the measuring network 31n. The control valves for the burner 20 of FIG. 1 are operated by controller 240 by way of mechanical link 224 (corresponding with the link 24 of the accompanying drawings and also with mechanical link or coupling 64 of the Davis patent).

Figure 6:
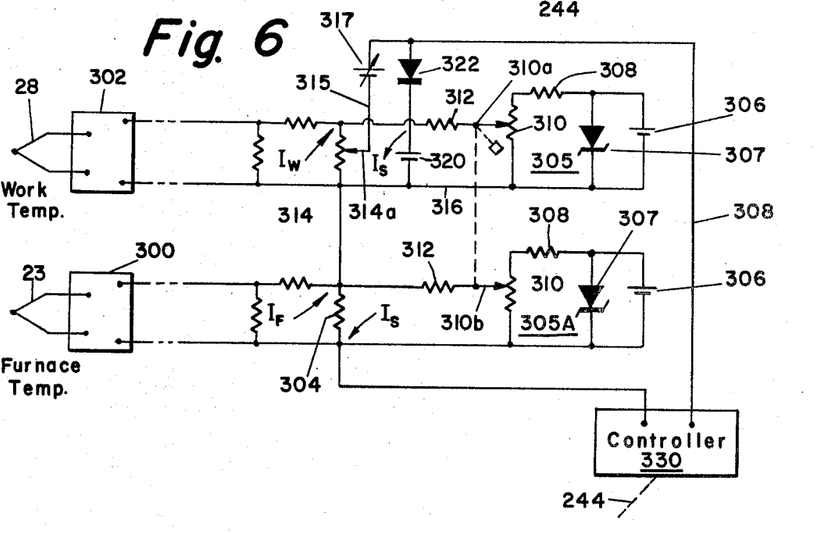

The modification of FIG. 6 schematically illustrates the manner in which current converters may be utilized as part of the control system, more particularly, the thermocouples 23 and 28 are connected to current converters 300 and 302 which produce currents $I_f$ and $I_w$ respectively corresponding in magnitude to the measured furnace temperature and to the work temperature. These converters 300 and 302 are of the type shown in McAdam et al. Patent No. 2,901,563.

The set-point for the work temperature is provided by each of networks 305 and 305a, each of which includes a source of potential shown as a battery 306 and a zener diode 307 connected in shunt across the battery. Each parallel circuit is connected in series with a resistor 308 of nickel alloy which provides temperature compensation in direction to maintain across resistor 310 a constant potential. The contacts 310a and 310b associated with resistors 310 may be manually set to positions corresponding with the work temperature set-point thus to produce currents, $I_s$ by way of high-valued resistors 312, proportional to the set-point temperature and in directions opposite to the currents $I_w$ and $I_f$ respectively. The resistor 314 is connected in common to the two circuits in which the currents $I_w$ and $I_s$ flow. Acordingly, the potential difference across resistor 314 will be proportional to the difference between these currents. This difference-voltage will then be proportional to the deviation of the work temperature from its control point and hence will represent the factor $\Delta T_2$. A fractional part of this potential is derived from resistor 314 by way of its contact 314a, the position of the tap 314a introducing the constant $K_1$. Accordingly the voltage developed between conductors 315 and 316 correspond with the factor $K_1 \Delta T_2$. The factor $K_2$ is added to the foregoing factor by an adjustable voltage source 317 thereby to produce between the conductor 316 and a conductor 318 a voltage corresponding with the factor $K_1 \Delta T_2 + K_2$. The limiting circuit is provided by back-bias battery 320 and a diode 322.

Similarly, the potential difference developed across resistor 304 will be proportional to $\Delta T_1$, the difference between the furnace temperature and the set-point temperature of the work. The controller 330 of the same type as controller 70 of FIG. 1 responds to the difference between the voltage across resistor 304 and the sum of the voltages in the remainder of the series circuit including controller 330. Mathematically, the operation is the same as for FIG. 1, specifically Controller input voltage $= \Delta T_2 - (K_1 \Delta T_1 + K_2)$ The following design information for selected applications will be useful in practicing the invention. In applying circuits of the type shown in FIGS. 1 and 2 to the control of common types of batch type annealing furnaces having loads in the order of 15,000 lbs., for example, the constant $K_1$ will generally be within a range of values between ½ and 3. For many applications a value of 1.5 will be preferred. The value of $K_3$, on the other hand, must usually be much greater than $K_1$ and may desirably have a range of values from 10 to 15. The value for $K_3$ is more or less fixed by the furnace construction and should be adjusted to be at the highest possible value which can be used without undesirable overshoot of the temperature $T_3$. A value of 10 for $K_3$ has been used with good results. A limit on the value $K_3 \Delta T_3$ equal to 300° F. was found to be satisfactory for the above mentioned load and with the specific values mentioned for the constants $K_1$ and $K_3$.

The value for $K_2$ will, of course, depend upon the temperature set point and the furnace construction. In a typical installation it may be 100° F., for example.

With regard to the values of $K_1$ and $K_3$ the ratio $K_3/K_1$ will generally have to be increased by decreasing $K_1$ with an increase in the degree of non-uniformity of the load and will be decreased by increasing $K_1$ with the amount of overshoot that can be tolerated for temperature $T_3$.

The limit on the heat-head will, of course, depend on the furnace being used since it will be related to the maximum temperature which the furnace will tolerate.

What is claimed is:

1. A control system for regulating the heat input to a furnace during a period in which the work therein is being elevated to a set-point temperature, comprising
    means for developing a work-temperature signal corresponding to the temperature of the work,
    means responsive to said temperature signal for computing a desired temperature for the furnace as required to establish in said furnace a heat-head necessary to bring said work to said predetermined set-point temperature without undesired overshoot, and
    means responsive to the difference between the actual temperature of the furnace and said computed desired temperature for controlling said heat input to bring said furnace to its said computed desired temperature without overshoot whereby said temperature of said work due to said heat-head rises to said set-point without overshoot.

2. A control system for regulating the heat input to a furnace during a period in which the work therein is being elevated to a set-point temperature, comprising
    means for producing a first signal related to the deviation of the temperature of the work from said set-point and representative of the desired heat-head in said furnace, means for producing a second signal corresponding to the deviation of the temperature of the high temperature area of the furnace from the said work temperature set-point, and means for controlling said heat input to maintain said first and second signals in equality.

3. A control system for regulating the heat input to a batch type furnace to establish as rapidly as possible a predetermined set-point temperature for a load therein where the heat transfer to the load is subject to a lag, comprising means for producing a first signal representative of the deviation of the furnace temperature from said predetermined temperature, means for producing a second signal representative of a computed value at which said first signal should be maintained to prevent any overshooting of the temperature of said load during heat-up, said last-named means including a third signal representative of the deviation of the temperature of the load from said predetermined value, means producing a signal representing a first constant, means producing a signal representing a second constant, means for establishing said second signal as the sum of said third signal times said signal representing said first constant plus said signal representing said second constant, and means responsive to the difference between said first and second signals to vary said heat input to tend to maintain the difference between said first and second signals at a minimum.

4. A control system for regulating the heat input to a furnace during a period in which the work therein is being elevated to a set-point temperature, comprising means for developing a work-temperature signal of magnitude proportional to the temperature of the work, means for developing a reference-temperature signal equal to the magnitude of said work-temperature signal with said work at its set-point temperature, storage means, means for applying to said storage means the difference between said work-temperature signal and said reference-temperature signal to establish in said storage means a first difference signal, means for developing a furnace-temperature signal which varies in magnitude with change in temperature of the furnace, means for developing a second difference signal proportional to the difference between said furnace-temperature signal and said reference-temperature signal, means for modifying said first difference signal by a weighting factor of magnitude determined by the weight of the load and the heat storage capacity of said furnace to produce a modified signal, means for developing a heat-loss signal of magnitude representative of heat losses from the furnace, means for combining said modified signal and said heat-loss signal, the resultant combined signal being representative of the heat-head of said furnace which will elevate the work to its set-point temperature, and means responsive to the difference between said combined signal and said second difference signal for varying the temperature of the furnace in the direction tending to make said second difference signal and said combined signal equal to each other.

5. The control system of claim 4 in which means are provided to limit the maximum temperature of the furnace below the value computed by said difference between said first difference signal and said combined signal until the work has risen to a temperature below its set-point temperature by an amount such that said value computed by said difference is less than the maximum permissible heat-head for said furnace.

6. The control system of claim 4 in which said means responsive to the temperature of the work includes a plurality of temperature-measuring devices disposed relative to the work in zones in which temperature rise takes place at different rates, and means for combining signals from said plurality of devices for developing a work-temperature signal.

7. The control system of claim 6 in which said furnace-temperature limiting means is primarily responsive to that one of said plurality of temperature-measuring devices disposed in the zone in which the temperature rise of the work is greatest.

8. A control system for regulating the heat input to a furnace during a period in which the work therein is being elevated to a set-point temperature, comprising means for developing a work-temperature signal proportional to the temperature of the work, means for developing a reference-temperature signal equal to the work-temperature signal at the time said work arrives at its set-point temperature, means for developing a first difference signal $\Delta T_2$ equal to the difference between said work-temperature signal and said reference-temperature signal, means for modifying said difference signal by a proportionality constant $K_1$ of magnitude related to the weight of the load and the heat storage capacity of the furnace to produce a first modified signal, means for developing a heat-loss signal $K_2$ of magnitude proportional to the heat losses of said furnace, means for combining said first modified signal and said heat-loss signal for producing a signal proportional to the heat-head of said furnace, means responsive to the difference between the actual temperature of the furnace and the set-point temperature of the work for producing a second difference signal $\Delta T_1$, and means responsive to the difference between said signals representative respectively of $\Delta T_1$ and the quantity $(K_1 \Delta T_2 + K_2)$ for controlling the heat input of said furnace in direction to reduce said last-named difference to zero.

9. The control system of claim 8 in which means are provided to limit the maximum value of said heat-head to a value below its computed value for limiting the maximum temperature to which said furnace may be heated prior to arrival of said work at its set-point temperature.

10. The control system of claim 8 in which said means for developing said work-temperature signal includes at least one temperature-measuring device responsive to a region of the work in which the temperature rapidly rises and at least another temperature-responsive device responds to a region of the work in which the temperature thereof rises more slowly, and in which there are separately developed difference signals $\Delta T_2$ for the region more slowly rising in temperature and $\Delta T_3$ for the region more rapidly rising in temperature and in which both signals representative of $\Delta T_2$ and $\Delta T_3$ are modified, the former by a proportionality constant $K_1$ which is significantly lower than a proportionality constant $K_3$ for the difference signal $\Delta T_3$.

11. The control system of claim 10 in which means are provided to limit the signals representative of said quantity $K_3 \Delta T_3$ to a predetermined maximum value to prevent excessive overshoot of the set-point temperature by that region of the work in which the temperature rapidly rises.

12. A control system for regulating the heat input to a furnace during a period in which the work therein is being elevated to a set-point temperature, comprising a first temperature-responsive means for producing a signal varying with the average temperature of the work within the furnace, a second temperature-responsive means disposed within the furnace for producing an output proportional to the highest temperature in said furnace, a measuring system, means for connecting first one and then the other of said temperature-responsive means to said measuring system for producing outputs representative of the magnitudes thereof, means for generating difference signals proportional in magnitude to the difference between said output signals and the signals of magnitude proportional to said set-point temperature, means for storing one of said difference signals during the development of the other of said difference signals, means for modifying the difference signal between said work temperature and said reference temperature by a proportionality constant to produce a third difference signal from said first and second difference signals, and means responsive to said third difference signal for regulating the temperature of said furnace.

References Cited by the Examiner

UNITED STATES PATENTS

| | | |
|---|---|---|
| 2,015,838 | 10/1935 | Borden et al. |
| 2,184,975 | 12/1939 | McConville et al. _____ 236—15 |
| 2,283,007 | 5/1942 | Krogh _____________ 236—15 |
| 2,455,654 | 12/1948 | Browne _____________ 236—69 |
| 2,887,271 | 5/1959 | Akin et al. __________ 236—15 |
| 3,011,709 | 12/1961 | Jacoby _____________ 236—151 |
| 3,050,256 | 8/1962 | Fuller _____________ 236—15 |
| 3,092,321 | 6/1963 | Cranch et al. ________ 236—15 |

ALDEN D. STEWART, *Primary Examiner.*